(12) United States Patent
Kapur et al.

(10) Patent No.: US 6,631,344 B1
(45) Date of Patent: Oct. 7, 2003

(54) METHOD AND SYSTEM FOR PERFORMING DETERMINISTIC ANALYSIS AND SPECULATIVE ANALYSIS FOR MORE EFFICIENT AUTOMATIC TEST PATTERN GENERATION

(75) Inventors: Rohit Kapur, Cupertino, CA (US); Thomas W. Williams, Boulder, CO (US)

(73) Assignee: Synopsys, Inc., Mountain View, CA (US)

(*) Notice: Subject to any disclaimer, the term of this patent is extended or adjusted under 35 U.S.C. 154(b) by 0 days.

(21) Appl. No.: 09/277,570

(22) Filed: Mar. 26, 1999

(51) Int. Cl.$^7$ .................................................. G06F 9/45
(52) U.S. Cl. ............................ 703/22; 702/117; 716/4; 714/728; 714/738; 714/741
(58) Field of Search .................. 703/13–22; 716/4–16; 714/724–741; 702/117

(56) References Cited

U.S. PATENT DOCUMENTS 6,182,258 B1 * 1/2001 Hollander .................... 714/739

OTHER PUBLICATIONS

Rudnick et al, "Combining Deterministic and Genetic Approaches for Sequential Circuit Test Generation", Proceedings of the 32nd ACM/IEEE Conference on Design Automation, pp. 183–188 (1995).*

Nachman et al, "A Novel Approach To Random Pattern Testing Of Sequential Circuits", IEEE Transactions on Computers, vol. 47 Issue 1, pp. 129–134 (Jan. 1998).*

Kajihara et al, "On Test Pattern Compaction Using Random Pattern Fault Simulation", IEEE Proceedings of the 11th International Conference on VLSI Design, pp. 464–469 (Jan. 1998).*

Peymandoust et al, "Implementing a Complete Test Tool Set in VHDL", IEEE Proceedings of the VHDL International Users' Forum, pp. 2–10 (Oct. 1997).*

Kunzmann, "Efficient Random Testing With Global Weights", Proceedings of the EURO–DAC '96 Design Automation Conference, pp. 227–232 (Sep. 1996).*

* cited by examiner

Primary Examiner—Samuel Broda
(74) Attorney, Agent, or Firm—Bever, Hoffman & Harms, LLP; Jeanette S. Harms

(57) ABSTRACT

In a computer implemented synthesis system, a method of generating a test pattern for use in testing device with ATE (automated test equipment). The computer implemented steps of receiving a netlist specification representing a design to be realized in physical form and storing the netlist specification in a computer memory unit, and simulating the netlist using the computer implemented synthesis system. Using the simulation instantiated within the synthesis system, deterministic test pattern generation is performed to obtain a first portion (partial) of a test pattern. The test pattern is operable to detect a fault in the circuit netlist once speculative test pattern generation is performed to obtain a remaining portion of the test pattern. The first portion and the remaining portion of the test pattern comprise a test vector operable to detect the fault when used with automated test equipment for testing a device resulting from the design.

13 Claims, 7 Drawing Sheets

METHOD AND SYSTEM FOR PERFORMING DETERMINISTIC ANALYSIS AND SPECULATIVE ANALYSIS FOR MORE EFFICIENT AUTOMATIC TEST PATTERN GENERATION

FIELD OF THE INVENTION

The field of the present invention pertains to the testing of integrated circuits. More particularly, the present invention pertains to a method and system for efficiently generating test vectors for use with automated testing equipment (ATE) for testing integrated circuits to detect faults therein.

BACKGROUND OF THE INVENTION

Computer systems, software applications, and the devices and processes built around them are continually growing in power and complexity. Society's reliance on such systems is likewise increasing, making it critical that the systems obey the properties their designers intended. Typically, the more powerful and complex the system, the greater its utility and usefulness. However, as these computer and software implemented systems and processes become more powerful, detecting and correcting flaws within the systems becomes increasingly difficult.

As integrated circuits, and particularly the logic portion of integrated circuits, have become more complex and more dense, they have become progressively harder to test in order to ensure correct and complete functionality. For example, with current technology, as the total number of transistors fabricated within an integrate circuit die increases, the amount of time which the integrated circuit emerging from a fabrication process line spends in testing increases as well.

The most modern integrate circuit devices are achieving greater and greater densities. The higher densities are greatly increasing the costs associated with devising sufficiently accurate tests which adequately ensure the complete functionality of the most sophisticated devices. Higher densities are achieved in part by reducing the amount of space between transistors and other components which comprise the integrated circuit. As such, the "place and route" tolerances for the integrate circuit are reduced, and the potential for introducing errors and introducing structural faults in the circuit itself increases. Additionally, the complicated placement of the internal structure and nature of the faults encountered in such high density integrated circuits requires the use of sophisticated algorithms in order to ensure adequate error detection (e.g., being able to determine whether structural faults between the closely spaced gate elements, such as a bit short, broken link, or the like, exist). Hence, the testing cost can be very significant for the latest and largest high density integrated circuits. Very sophisticated test programs, automatic test pattern generation (ATPG) programs, are used to analyze the various netlists representative of the integrated circuit designs and generate therefrom the test patterns (e.g., also referred to as test programs or test vectors) used for testing the devices in ATE systems.

As is well known, a typical integrated circuit has two categories of faults, commonly referred to as "easy faults" and "hard faults". Easy faults are categorized as those faults that can be detected by a large number of different test programs, or "test vectors". Easy faults tend to have relatively few inputs required in order to generate the characteristic output from the integrate circuit which indicates the presence of the fault. Hard faults are characterized as those faults which are detectable by very few test vectors. Hard faults tend to have large numbers of inputs, each of which must be correct, required in order to create a difference in the operation of the good and faulty circuit at an output to indicate the presence of a fault.

Thus, as should be noted by the above definition, a randomly generated test vector would likely detect at least one or more easy faults but very few, if any, hard faults. The effort spent in generating a random test pattern is much less than the effort expended in the deterministic counterpart; the deliberate stepwise generation of the precisely targeted deterministic test pattern. Accordingly, automatic test pattern generation for detecting easy faults is a much more straightforward process then test pattern generation for detecting the hard faults. With very high density integrated circuits, using deterministic test pattern generation to obtain near complete coverage of the design is very expensive (e.g., extremely compute intensive).

The objective of the automatic test pattern generation program is to generate an accurate, high coverage test pattern as efficiently as possible, to reduce the cost. Accordingly, most prior art automatic test pattern generation programs are configured to utilize a random pattern generation phase before using a deterministic test generation phase. The intent of this scheme is to minimize the cumulative computer system run-time required for generating a precise end-to-end deterministic test pattern.

Prior art automatic test pattern generation programs proceed through a random test vector generation phase in order to provide for the detection of easy faults. The random phase is followed by a deterministic phase, wherein the program deliberately and deterministically generates test vectors for detecting each of the remaining faults, e.g., the hard faults.

The problem with this approach, is the fact that even though the automatic test pattern generation program uses relatively fast random test pattern generation in its first phase, the second deterministic phase still requires an inordinate amount of processing time. Each hard fault requires a full deterministic analysis of the logic circuitry to determine a test pattern capable of revealing the presence of the hard fault. Generating test patterns for detecting all of the hard faults can thus be very expensive.

Thus, what is required is an automatic test pattern generation program capable of generating a test vector in much less time than the prior art. What is required is an algorithm for generating test vectors which is much more efficient than the prior art algorithms. The required solution should be capable of quickly generating test patterns for detecting easy faults. Additionally the required solution should be capable of generating test patterns for detecting each of the remaining hard faults in less time than the prior art.

SUMMARY OF THE INVENTION

The present invention provides an automatic test pattern generation program capable of generating a test vector in much less time than the prior art the present invention provides an algorithm for generating test vectors which is much more efficient than the prior art algorithms. The present invention provides a method and system capable of quickly generating test patterns for detecting easy faults, and a method and system for generating test patterns for detecting each of the remaining hard faults in less time than the prior art.

In one embodiment, the present invention is implemented as an ATPG process executing within a CAD workstation.

The ATPG process uses a speculative algorithm to efficiently generate test vectors for an integrated circuit. The test vectors are subsequently used with ATE (automated test equipment). The speculative process (at times referred to as speculative ATPG) includes the computer implemented steps of receiving a netlist specification representing the design of the integrated circuit in the RAM of the CAD workstation, and processing and simulating the netlist. Using the instantiated simulation, random test pattern generation is used to obtain the test vectors for the easy faults. Then, for each remaining hard fault, deterministic test pattern generation is performed to obtain a portion of the test vector. The test vector created as a result of this step is a partial solution of the complete deterministic test pattern generation process. Random analysis is then performed to obtain a remaining portion of the test vector. The partial deterministic portion and the remaining randomly generated portion comprise an entire test vector operable to detect the fault when used with the ATE.

In so doing, the present invention leverages the fact that random analysis is more efficient, less expensive, and much faster than deterministic analysis, and that random analysis has a greater probability of success when used in conjunction with deterministic analysis. This allows the ATPG process of the present invention to generate test vectors for detecting each of the remaining hard faults in less time than the prior art.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Figure 1:
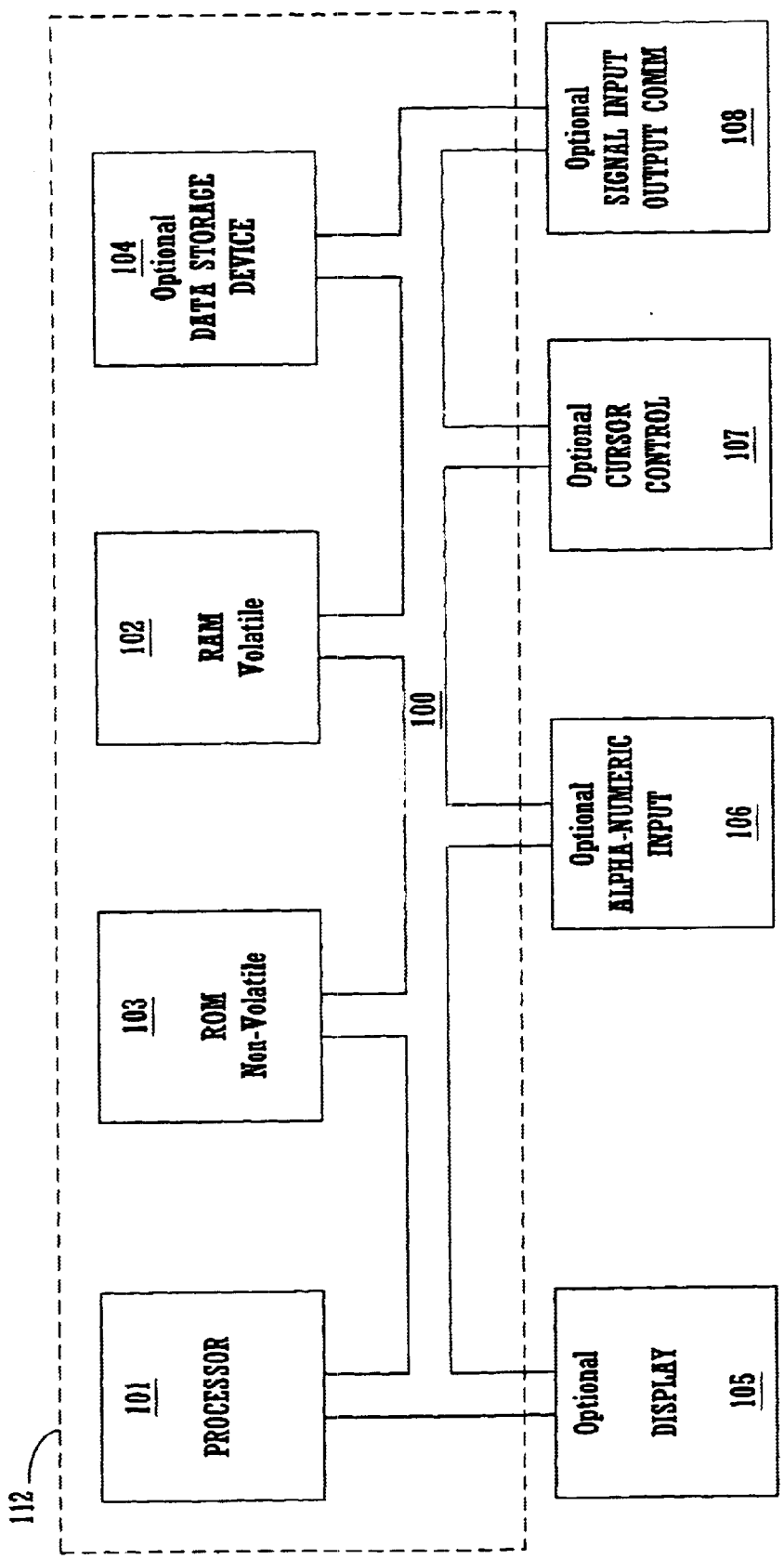
FIG. 1 shows a design synthesis CAD workstation in accordance with the present invention.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to obscure aspects of the present invention unnecessarily.

The present invention provides an automatic test pattern generation program capable of generating a test vector in much less time than the prior art. The present invention provides an algorithm for generating test vectors which is much more efficient than the prior art algorithms. The present invention provides a method and system capable of quickly generating test patterns for detecting easy faults, and a method and system for generating test patterns for detecting each of the remaining hard faults in less time than the prior art. The present invention and its benefits are further described below.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "computing," "translating," "instantiating," "determining," "displaying," "recognizing," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices.

COMPUTER SYSTEM ENVIRONMENT

Referring to FIG. 1, a computer system 112 is illustrated. Within the following discussions of the present invention, certain processes and steps are discussed that are realized, in one embodiment, as a series of instructions (e.g., software program) that reside within computer readable memory units of system 112 and executed by processors of system 112. When executed, the instructions cause computer system 112 to perform specific actions and exhibit specific behavior which is described in detail to follow.

Specific aspects of the present invention are operable within a programmed computer aided design (CAD) system.

A CAD system operable to implement the elements (e.g., a computer implemented synthesis system) of the present invention is shown in FIG. 1. In general, the CAD system of the present invention includes an address/data bus 100 for communicating information, one or more central processor(s) 101 coupled with bus 100 for processing information and instructions, a computer readable volatile memory unit 102 (e.g., random access memory, static RAM, dynamic RAM, etc.) coupled with bus 100 for storing information and instructions for the central processor(s) 101, a computer readable non-volatile memory unit 103 (e.g., read only memory, programmable ROM, flash memory, EPROM, EEPROM, etc.) coupled with bus 100 for storing static information and instructions for processor(s) 101. System 112 can optionally include a mass storage computer readable data storage device 104, such as a magnetic or optical disk and disk drive coupled with bus 100 for storing information and instructions. Optionally, system 112 can also include a display device 105 coupled to bus 100 for displaying information to the computer user, an alphanumeric input device 106 including alphanumeric and function keys coupled to bus 100 for communicating information and command selections to central processor(s) 101, a cursor control device 107 coupled to bus for communicating user input information and command selections to the central processor(s) 101, and a signal input/output device 108 coupled to the bus 100 for communicating messages, command selections, data, etc., to and from processor(s) 101.

Program instructions executed by the CAD system can be stored in RAM 102, ROM 103, or the storage device 104 and, when executed in a group, can be referred to as logic blocks or procedures. It is appreciated that data produced at the various logic synthesis stages of the present invention, including representations of the different levels of abstraction of the integrated circuit design, can also be stored in RAM 102, ROM 103, or the storage device 104 as shown in FIG. 1.

The display device 105 of FIG. 1 utilized with the computer system 112 of the present invention may be a liquid crystal device, cathode ray tube, or other display device suitable for creating graphic images and alphanumeric characters recognizable to the user. The cursor control device 107 allows the computer user to signal dynamically the two dimensional movement of a visible pointer on a display screen of the display device 105. Many implementations of the cursor control device are known in the art including a trackball, mouse, joystick, or special keys on the alphanumeric input device 105 capable of signaling movement of a given direction or manner of displacement.

THE SPECULATIVE ATPG PROCESS OF THE PRESENT INVENTION

Figure 2:
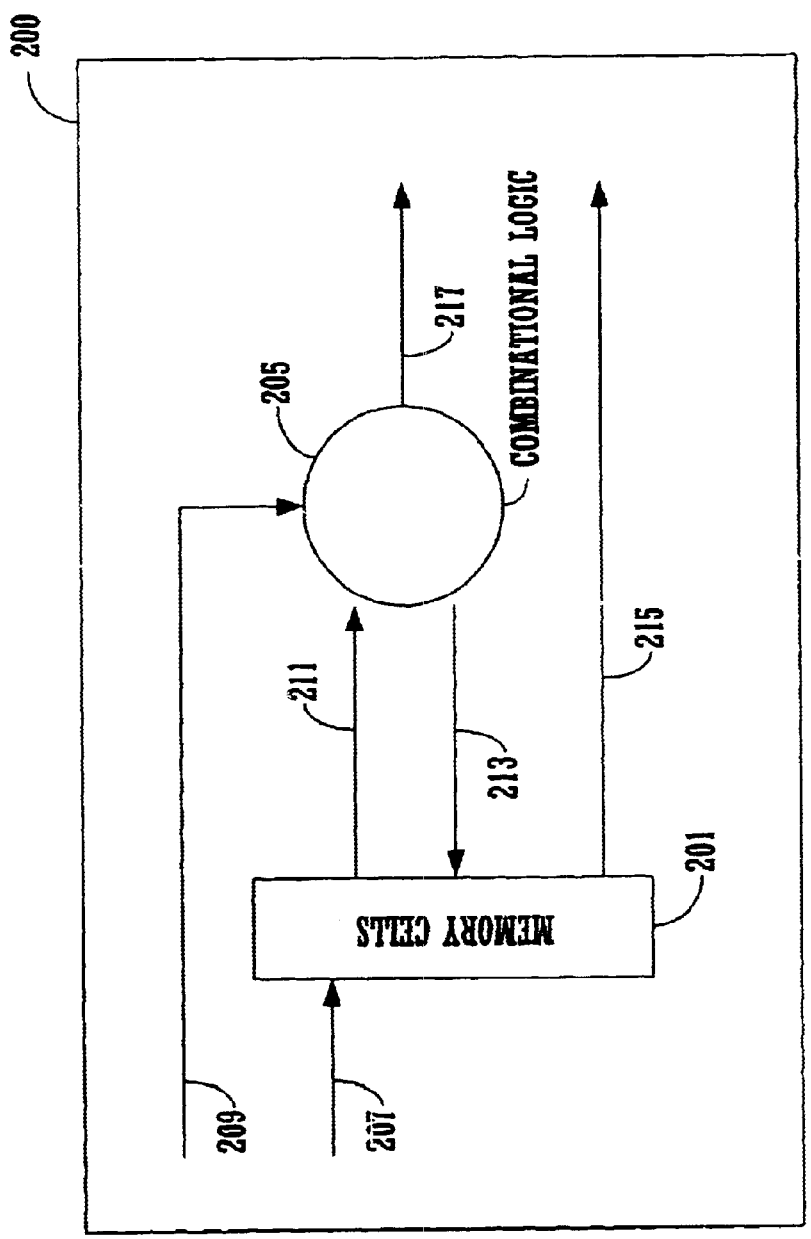
FIG. 2 shows a portion of a netlist upon which the speculative ATPG process of the present invention is practiced.

FIG. 2 illustrates an exemplary circuit model 200 utilized by the present invention to represent one of many logic units comprising an integrated circuit. As used herein, a circuit model refers to an HDL netlist which represents the logical design of the integrated circuit. The HDL netlist is used to generate corresponding fabrication components (e.g., lithography masks, etc.) used to fabricate the actual device silicon. As depicted in FIG. 2, the model 200 includes a memory cell block 201 that outputs signals over line 211 to a combinational logic block 205. Combinational logic block 205 also outputs signals over line 213 to drive inputs of the memory cells 201. Memory 201 receives a primary input signal 207 which typically originates off chip. Combinational logic block 205 also receives a primary input signal 209 which typically originates off chip. Memory block 201 generates a primary output signal 215 that goes off chip and combinational logic block 205 also generates a primary output signal 217 that goes off chip. For purposes of explanation, the memory cell technology employed by the netlists described herein include edge triggered flip-flops and other types, such as level sensitive modes, e.g., Level Sensitive Scan Design (LSSD) modes, clocked scan modes, clocked LSSD modes, and auxiliary clocked LSSD modes. Model 200 is shown as an example netlist (or portion thereof) upon which the speculative ATPG process of the present invention is practiced.

As shown by FIG. 2, portions of combinational logic block 205 that are directly stimulated by primary input 209 and that are directly coupled by its output to primary line 217 can be readily tested for faults (faulty circuitry) by direct application of test vectors (predetermined data patterns) over line 209 and by direct observation of the output over line 217. However, this represents only a small percentage of the logic of block 205. In typical applications, most of the logic gates within block 205 receive their inputs from memory cells within 201 and forward their outputs to other memory cells within 201. In order to test accurately the combinational logic within block 205, DFT processes provide a mechanism for isolating different logic groups within block 205 by (1) passing test vectors into the memory cells 201, (2) allowing the stimulated logic groups to store the product information in predetermined memory cells, and then (3) recalling the output from stimulated portions of block 205 from memory 201.

In effect, test vectors are scanned into the memory cells during test mode, the combinational logic is operated, and its output is then captured in the memory cells to be scanned out. Thus, the test vectors provide the necessary inputs in order to detect the presence of faults within model 200. Each of the vast number of similar components comprising a modern high density integrated circuit are similarly DFT configured to provide observability to the internal nets. The primary purpose of the automatic test generation program is to efficiently generate test vectors which, using the DFT provided resources within the integrated circuit, provide a high degree of coverage, detecting both easy faults and hard faults.

Figure 3:
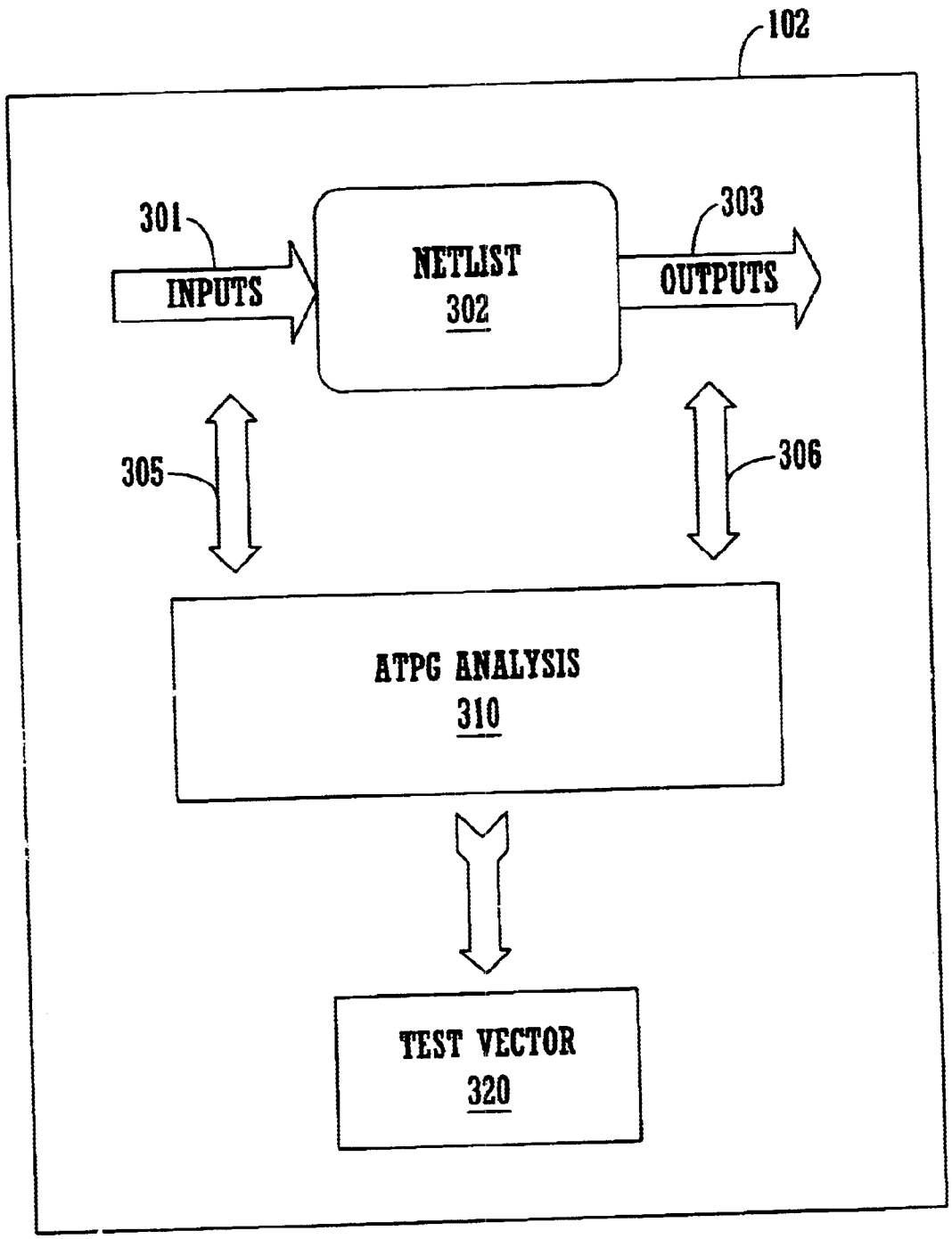
FIG. 3 shows an overview diagram of the speculative ATPG process in accordance with one embodiment of the present invention.

Referring now to FIG. 3, a overview diagram of an ATPG analysis system in accordance with one embodiment of present invention is shown. As depicted in FIG. 3, the ATPG analysis system of the present invention is instantiated within RAM 102 of CAD system 112. Instantiated within the RAM 102 is a netlist 302 and an automatic test pattern generation analysis program 310. As described above, netlist 302 models the functionality of an integrated circuit device. Netlist 302 is a logical model of the logic elements comprising the functionality of the integrated circuit device. As such, netlist 302 includes numerous elements similar to model 200 of FIG. 2.

As with model 200, netlist 302 is implemented as a simulation running within CAD system 112. CAD system 112 simulates the functionality, the interaction, and the characteristics of the various elements comprising netlist 112. This simulation allows CAD system 112 to determine whether the performance of the design specified by netlist 302 is within expected tolerances. Netlist 302 is stimulated by inputs 301. Inputs 301 are operated on by netlist 302, thereby generating outputs 303. As described above, test vectors are scanned into netlist 302 and resulting captured data is scanned out of netlist 302 via scan chains. This interaction is are presented in FIG. 3 as lines 305 and 306. The automatic test pattern generation analysis program 310 interacts with netlist 302 by providing stimulus and observing the outputs in order to determine the correct test vectors. Netlist 302 is simulated within the RAM 102 of CAD system 112. The automatic test pattern generation analysis program 310 functions by applying a series of inputs to the simulated netlist, for example, via lines 305 and 301, and observing the resulting outputs, for example, via lines 303 and 306. Faults are detected by observing incorrect outputs in response to the predetermined test inputs. The output of automatic test pattern generation analysis 310 is a test vector 320 to detect the presence of specific one or more faults within netlist 302.

Referring still to FIG. 3, in accordance with the present invention automatic test pattern generation analysis program 310 performs both deterministic test pattern generation and speculative test pattern generation. As used herein, and as is well known by those skilled in the art, deterministic test pattern generation generally refers to the step-by-step process of logically determining the precise values of a test vector required to detect the presence of a specific fault.

In contrast, random test pattern generation functions by automatic test pattern generation program 310 randomly generating sets of inputs to the netlist 302 (e.g., random test vectors), applying them to the netlist 302, and observing the resulting outputs 303. As described above, faults are detected by observing incorrect outputs 303 with respect to the test vector inputs 302. Eventually, one of the randomly generated test vectors will be able to detect presence of the specific fault.

Randomly generating test vectors is several orders of magnitude faster than deterministicly generating test vectors. Random test pattern generation is able to detect upwards of 80 percent of the existing faults in the netlist. Thus, automatic test pattern generation analysis program 302 is typically able to detect a large majority of existing faults using the efficient random test pattern generation method.

With continuing reference to FIG. 3, the algorithm of the present invention recognizes the fact that easy faults are typically characterized by having fewer numbers of inputs required in order to reveal the faults. Hard faults are characterized by having larger numbers of inputs required to reveal the fault. Hence, it is far less likely to randomly generate a test vector capable of detecting a hard fault (e.g., randomly generating a large number of inputs correctly).

The present invention uses random automatic test program generation analysis to determine test vectors for detecting the easy faults within netlist 302. However, instead of using deterministic analysis to generate test vectors for discovering each of the remaining hard faults, the present invention uses a speculative analysis to much more efficiently generate test vectors for the remaining hard faults.

In accordance with the present invention, automatic test pattern generation analysis program 310 functions by, for each of the remaining hard faults, deterministically generating a portion (e.g., ½ to ¾) of the inputs required to detect the hard fault, then "speculating" on the remaining inputs. The remaining inputs required to detect the hard fault are randomly generated. The test is then simulated to determine if the fault is detected. Parallel fault simulation methods can be leveraged by randomly generating multiple times the partially specified test pattern and thus increasing the probability of detecting the targeted fault. This process of randomly generating the remaining inputs of a test vector is referred to herein as speculative generation. The first portion of the test vector for the hard fault is deterministicly generated, while the remaining portion is obtained via speculative generation.

This takes advantage of the fact that as inputs of the specific test vector are determined, statistically, it is more likely to randomly create the remaining inputs of the specific test vector such that the fault being targeted is detected. For example, if a certain type of fault required 10 specific inputs in order to detect its presence, random generation would be unlikely to determine the proper 10 inputs. However, if 5 or more of the specific inputs required to detect the hard fault are obtained using deterministic processing, the remaining inputs are statistically much more easily obtained using speculative generation. By deterministically obtaining less than the entire number of inputs required to detect the hard fault, and then speculatively obtaining the remaining required inputs, the present invention is able to determine a test vector for the hard fault in much less time than required by prior art. The speculative generation process of the present invention is further described in FIGS. 4 and 5 below.

Figure 4:
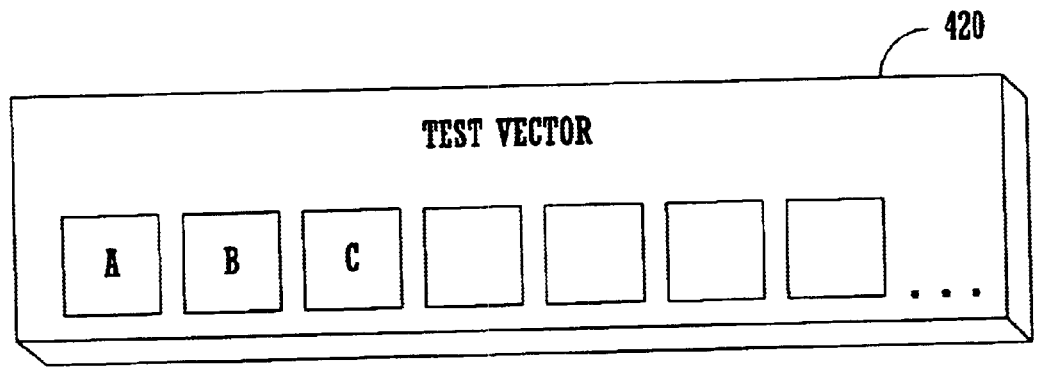
FIG. 4 shows a portion of a netlist containing an easy fault and a corresponding test vector.
Figure 4:
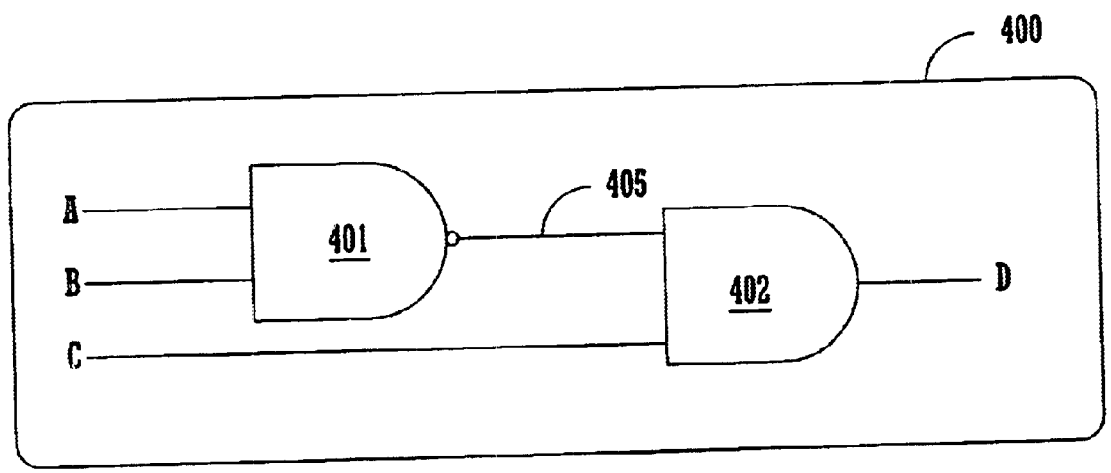

Referring now to FIG. 4, a test vector 420 for a fault within netlist portion 400 is shown. Netlist portion 400 shows a simple net (e.g., connection between logic elements) 405 between logic elements 401 and 402. Netlist portion 400 is merely a small portion of the large numbers of connections comprising netlist 302 of FIG. 3.

As depicted in FIG. 4, netlist portion 400 has three inputs, labeled A, B, and C. In the case where net 405 is shorted to Vdd (e.g., logical one), only certain values of A, B, and C will reveal the presence of this fault via output D. For example, values of 011 or 010 for A, B, and C will not show the fault on net 405. However, 111 will reveal the presence of fault on net 405. Hence, for the purposes of netlist portion 400, merely three positions of test vector 420. Since only 3 positions of test vector 420 are required to detect a fault on net 405, this fault is categorized as an easy fault, and test vector 420 is determined by the present invention using random generation.

Figure 5:
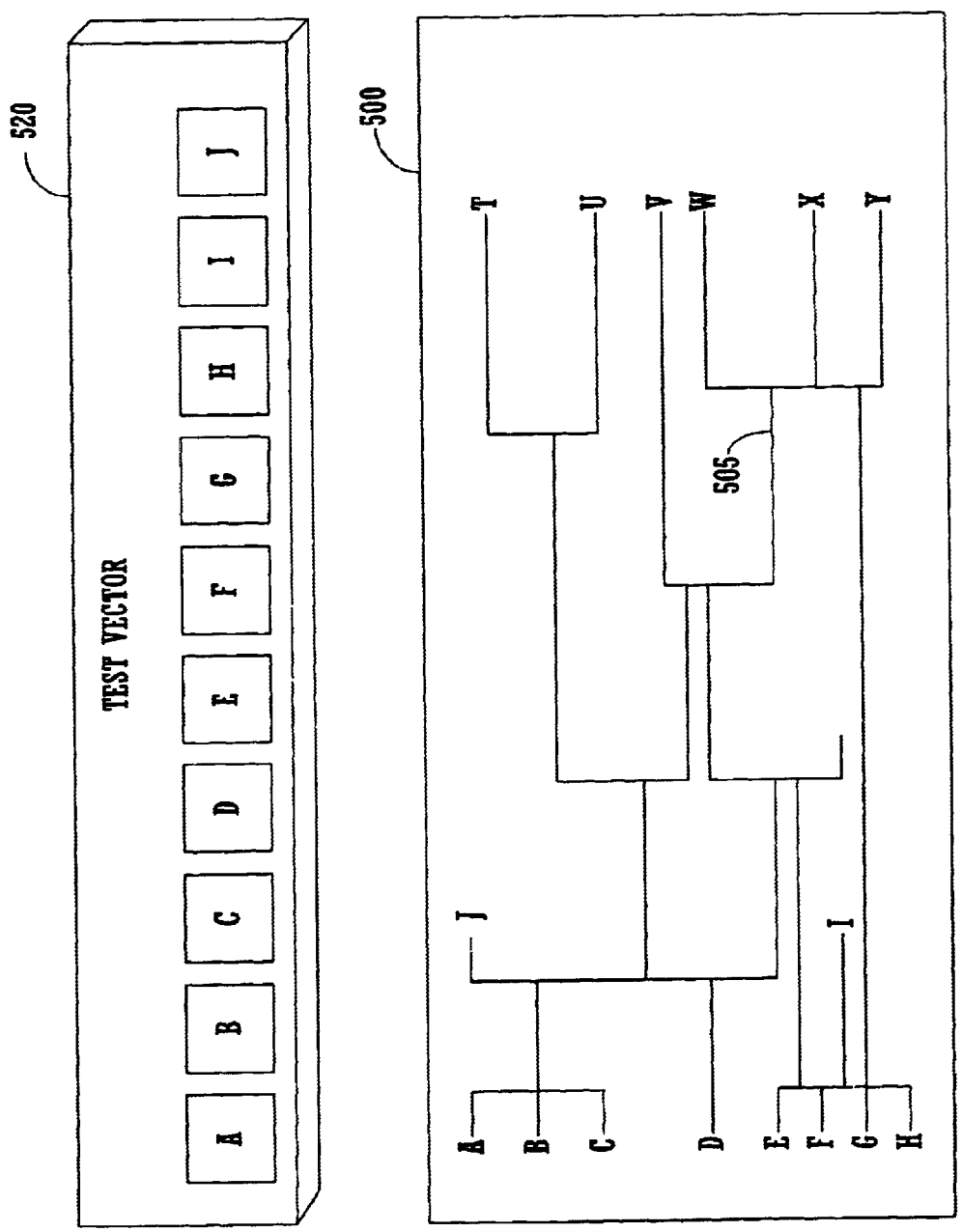
FIG. 5 shows a portion of a netlist containing a hard fault and a corresponding test vector.

Referring now to FIG. 5, a test vector 520 for a fault within netlist portion 500 is shown. Netlist portion 500 is similar to netlist portion 400 of FIG. 4, however, netlist portion 500 depicts a more complex circuit structure and a correspondingly more complex fault (e.g., a fault on net 505). As with netlist portion 400, netlist portion 500 is merely a small portion of the large numbers of connections comprising netlist 302 of FIG. 3.

As depicted in FIG. 5, netlist portion 500 has a number of inputs labeled A–J and a number of outputs labeled T–Y. In a case where net 505 is shorted to either Vdd or ground, a much larger test vector 520 is required to detect the fault on net 505 in comparison to test vector 420 of FIG. 4. For example, in this case, all inputs A–J are required to detect the fault on net 505. Hence, the fault on net 505 is categorized as a hard fault. Consequently, the present invention utilizes speculative ATPG to determine the required inputs of test vector 520.

As described above, speculative ATPG involves the use of deterministic analysis to obtain a first portion of the values of test vector 520, and the use of random analysis to obtain the remaining portion of the required values of test vector 520.

For example, with test vector 520, the speculative analysis functions by determining of a "boundary" between the first portion (for deterministic analysis) and the remaining portion (for random analysis). The boundary is determined using some sort of prediction method (e.g., testability metric, empirical experimentation, or other deterministic analysis on the network, etc.). Alternatively, the boundary can be determined by using processing run-time of CAD system 112, wherein deterministic test pattern generation is allowed to run for certain amount of time, and after which, random test pattern generation is used. Predicting a specific run-time for placement of the boundary can be empirically determined.

Deterministic analysis is performed until the a number of required values (e.g., inputs), such as, for example, 50% of the required values, are obtained. Thus, since there are much fewer remaining unknown required values, the remaining unknown required values of test vector 520 can be determined using random analysis. For example, values A–G can be deterministically obtained. The remaining values H–J are thus much easier to obtain using random generation. Thus, the present invention speculates on the remaining portion to obtain the remaining values, in this case values H–J.

Referring still to FIG. 5, if random analysis is unsuccessful in obtaining the remaining portion of test vector 520, the speculative analysis process of the present invention returns to deterministic test pattern generation, wherein deterministic test pattern generation is used to fill an additional number of the unknown values of the remaining portion, and then speculate to obtain the remaining values. Alternatively, deterministic test pattern generation can be used to fill all the remaining values of the test vector. The advantage of this method is the fact that speculative test pattern generation is not as expensive (e.g., compute intensive) as deterministic generation and the associated simulation is relatively fast when few hard faults are left. Thus, unsuccessful speculative test pattern generation does not add an overly significant amount of time to the test pattern generation process, where as if the speculation is correct, a significant amount of time is saved.

Another benefit of the present invention is the fact that the speculative generation process aids in compaction of the aggregate test data required for complete coverage. Since the deterministic phase of the present invention specifies fewer bit positions of the test vectors, more positions within the test vector are available for values targeted for testing different faults within the netlist 500.

Figure 6A:
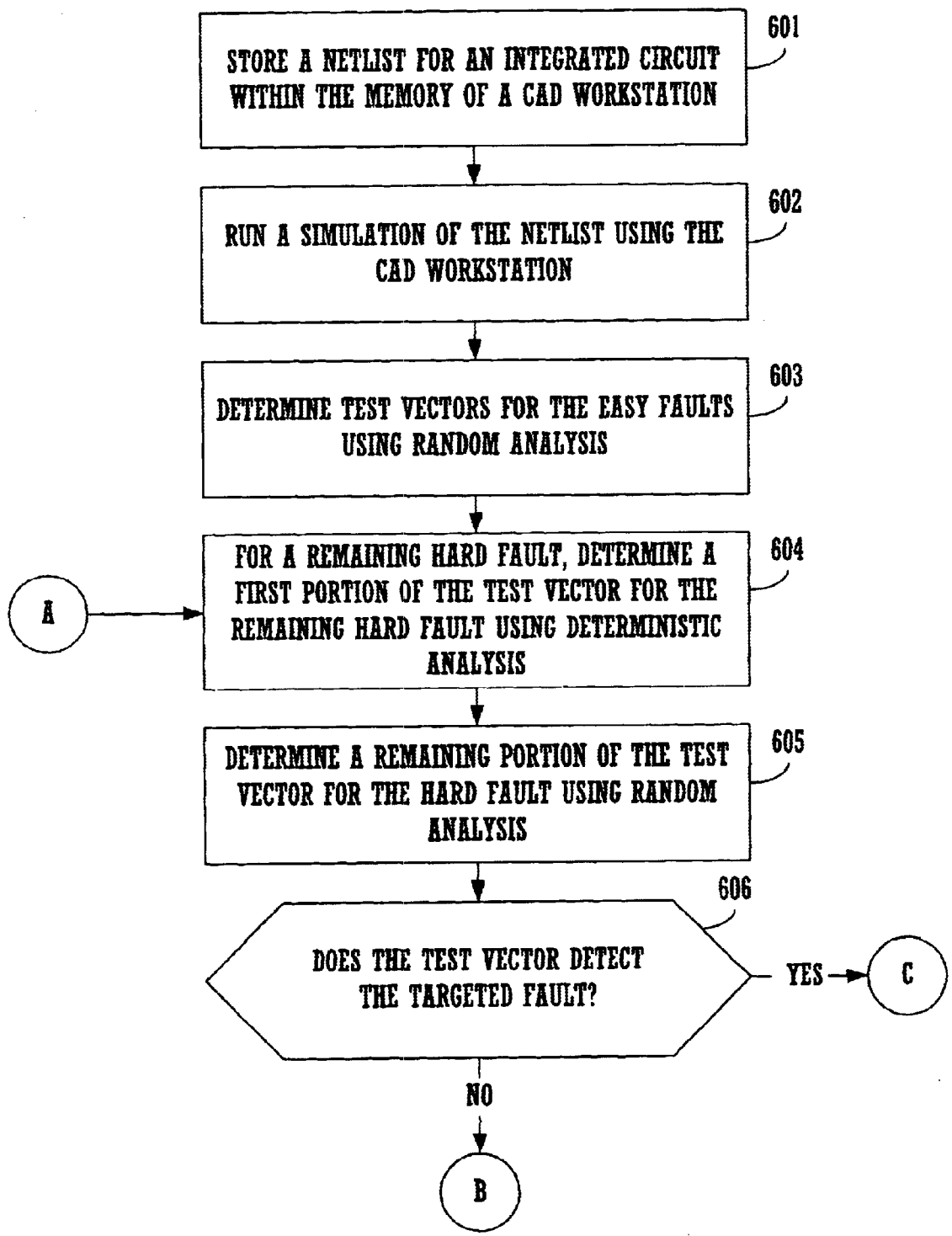
FIG. 6A shows a first portion of a flow chart of the steps of a speculative ATPG process in accordance with one embodiment of the present invention.
Figure 6B:
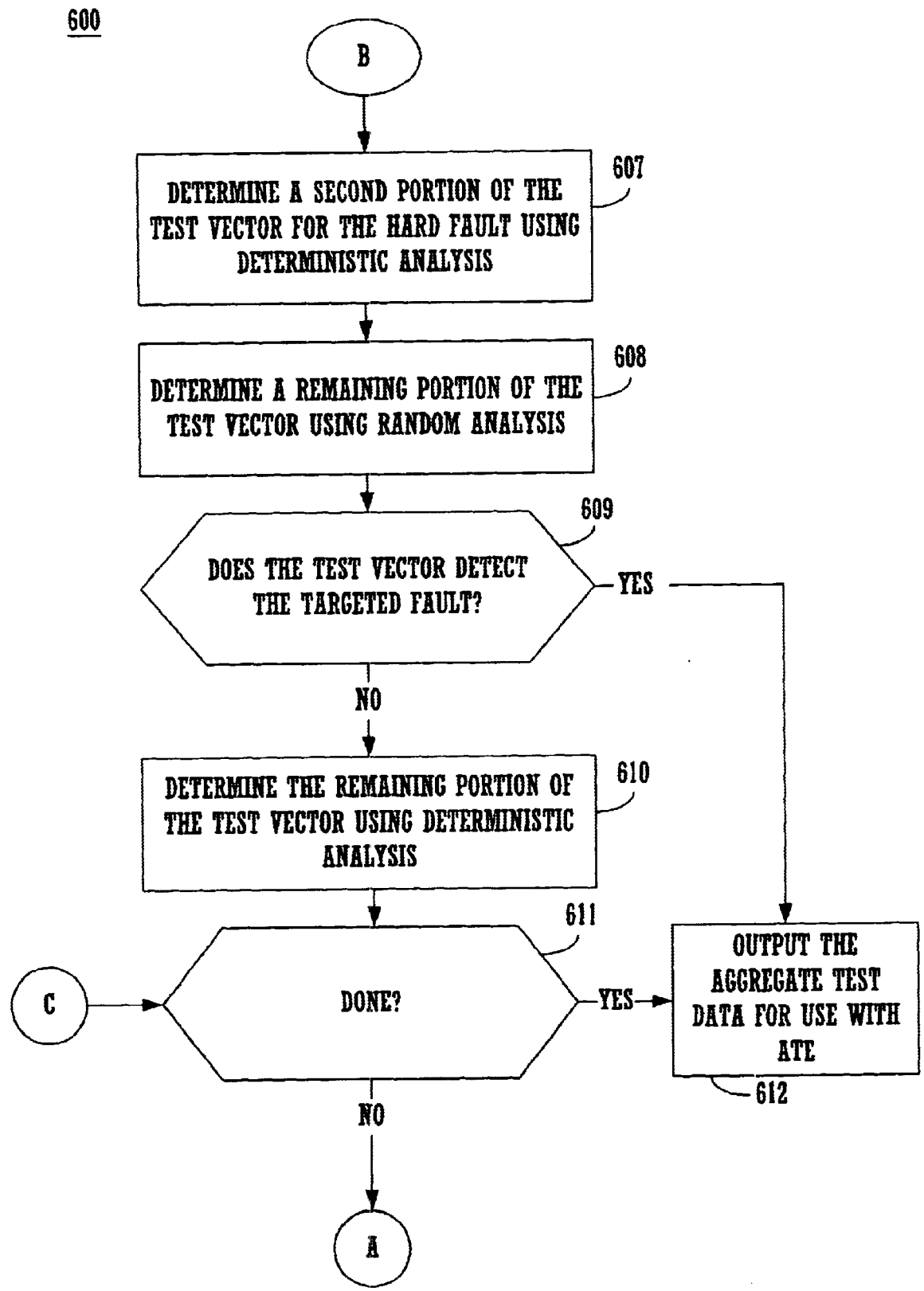
FIG. 6B shows a second portion of a flow chart of the steps of the speculative ATPG process in accordance with one embodiment of the present invention.

Referring now to FIG. 6A and FIG. 6B, a flow chart of the steps of a speculative ATPG process 600 in accordance with one embodiment of the present invention is shown. Process 600 depicts the steps of the operating process, of an ATPG analysis program (e.g., ATPG analysis 310 of FIG. 3) in accordance with the present invention as it generates test data (e.g., sets of test vectors) for testing devices represented by the netlist (e.g., netlist 302 of FIG. 3). Steps 601–606 are shown in FIG. 6A and steps 607–612 are shown in FIG. 6B. It should be noted that process 300 is but one embodiment of the speculative ATPG process of the present invention. As such, in each embodiment, implementation specific details may vary according to the individual requirements of the user.

Process 600 begins in step 601, where a netlist for an integrated circuit is stored within the memory of a CAD workstation (e.g., workstation 112 of FIG. 1). As described above, the netlist is a logical representation of the circuit components (logic gates, interconnects, etc.) of the integrated circuit. The netlist is used to simulate the performance of the integrated circuit in order to verify various aspects of the design. In step 602, the netlist is simulated on the CAD workstation 112. The simulation includes the instantiation of an ATPG analysis program (ATPG analysis program 310 of FIG. 3) operable to stimulate certain inputs of the netlist and observe the corresponding resulting outputs to develop test vectors for the resulting device.

In step 603, the ATPG analysis program 310 determines test vectors for the easy faults using the random analysis process. As described above, required values for the test vectors are randomly generated until the correct values are discovered. The random analysis process determines the test vectors for the easy faults. In step 604, for a hard fault within the netlist, process 600 determines a first portion of the test vector by using deterministic analysis. As described above, the first portion can comprise different percentages of the entire test vector, depending upon the characteristics of the netlist. Determining the first portion renders determining a remaining portion much less difficult.

Referring still to FIG. 6A, In step 605, a remaining portion of the test vector for the hard fault is determined using random analysis. As described above, once the first portion is determined, the remaining required values of the test vector are more easily determined using random analysis. Fewer required values to determine leads to greater probability of randomly obtaining them.

In step 606, if the test vector for the hard fault detects the targeted fault, process 600 proceeds to step 611 of FIG. 6B. Otherwise, process 600 proceeds to step 607 of FIG. 6B.

In step 607, if random analysis was unable to resolve all of the remaining portion correctly, a second portion of the test vector for the test vector is determined using deterministic analysis. The second portion is a subset of those required values which were unobtainable using random analysis. Since the remaining portion of step 605 could not be successfully resolved, process 600 goes through a second round of deterministic analysis to further reduce the number of unknown remaining required values. This makes the probability of success for subsequent random analysis much better.

Thus, in step 608, the "new" remaining portion is analyzed by the ATPG analysis program 310 to resolve the even fewer remaining required values. In most cases, step 608 will successfully resolve the entire test vector. If step 609 is successful, process 600 proceeds to step 611. However, as shown by step 609, if for some reason the test vector is still not complete (e.g., an extraordinarily long test pattern for a hard fault), process 600 proceeds to step 610, where any remaining values are fully determined using deterministic analysis until the test vector is complete.

In step 611, after having completely generated the test vector for the hard fault as the result of step 606, 609, or 610, process 600 continues to the next undetected hard fault remaining in the netlist as shown by "A", or if the fault list is completely processed, process 600 proceeds to step 612 where the aggregate test data (e.g., all test vectors for all easy faults and all hard faults) is output for later use with ATE.

In this manner, for hard faults, the process 600 embodiment of the present invention uses deterministic analysis to determine a first portion, then tries to resolve the remaining portion using random analysis, and if unsuccessful, performs more deterministic analysis and then more random analysis, and finally if still unsuccessful, fully resolves the test vector deterministicly. Process 600 is thus fully optimized to take advantage of the fact that random analysis is much less expensive than deterministic analysis.

Thus, the present invention provides an automatic test pattern generation program capable of generating a test vector in much less time than the prior art. The present invention provides an algorithm for generating test vectors which is much more efficient than the prior art algorithms. The present invention provides a method and system capable of quickly generating test patterns for detecting easy faults, and a method and system for generating test patterns for detecting each of the remaining hard faults in less time than the prior art.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. In a computer implemented synthesis system, a method of generating a test vector for use in testing device with ATE (automated test equipment) comprising the computer implemented steps of:
    a) receiving a netlist representing a design to be realized in physical form and storing the netlist in a computer memory unit;
    b) simulating the netlist using the computer implemented synthesis system;
    c) for at least one fault, using the netlist simulation within the computer implemented synthesis system, performing deterministic analysis on the netlist simulation to obtain a first portion of a test vector;
    d) using the netlist simulation within the computer implemented synthesis system, performing random analysis on the netlist simulation to obtain a remaining portion of the test vector; and
    e) storing the first portion and the remaining portion of the test vector as a complete test vector in the computer memory unit, the complete test vector adapted for use with automated test equipment for testing a physical device resulting from the design.

2. The method of claim 1, wherein the complete test vector is a hard fault test vector adapted for use with automated test equipment to detect a hard fault, wherein the hard fault requires a greater number of inputs in comparison to an easy fault to reveal a defect.

3. The method of claim 1, wherein the first portion of the test vector comprises a first plurality of required values of the test vector, and the remaining portion of the test vector comprises a second plurality of required values of the test vector, the required values each being one of a total number of design for test stimulus required for testing the netlist simulation.

4. The method of claim 1, further including the step of:
    if step d) does not successfully obtain all of the remaining portion of the test vector, using deterministic analysis to obtain a balance of the remaining portion of the test vector.

5. The method of claim 1, wherein steps b), c), d), and e) are performed by an automatic test pattern generation program running on the computer implemented synthesis system.

6. In a computer implemented synthesis system, a method of generating a test program for use in testing device with ATE (automated test equipment) comprising the computer implemented steps of:
    a) receiving a netlist representing a design to be realized in physical form and storing the netlist in a computer memory unit;
    b) simulating the netlist using the computer implemented synthesis system;
    c) for at least one fault, using the netlist simulation within the computer implemented synthesis system, performing deterministic analysis on the netlist simulation to obtain a first portion of a test program;
    d) using the netlist simulation within the computer implemented synthesis system, performing random analysis on the netlist simulation to obtain a remaining portion of the test program;
    e) storing the first portion and the remaining portion of the test program as a complete test program in the computer memory unit, the complete test program adapted for use with automated test equipment for testing a physical device resulting from the design; and
    f) using deterministic analysis to obtain a balance of the remaining portion of the test program if step d) does not successfully obtain all of the remaining portion of the test program.

7. The method of claim 6, wherein the complete test program is a hard fault test program adapted for use with automated test equipment to detect a hard fault, wherein the hard fault requires a greater number of inputs in comparison to an easy fault to reveal a defect.

8. The method of claim 6, wherein the first portion of the test program comprises a first plurality of required values of the test program, and the remaining portion of the test program comprises a second plurality of required values of the test program, the required values each being one of a total number of design for test stimulus required for testing the netlist simulation.

9. The method of claim 6, wherein steps b), c), d), and e) are performed by an automatic test pattern generation program running on the computer implemented synthesis system.

10. A CAD (computer aided design) design synthesis system for generating a test program for use in testing a device with ATE (automated test equipment), comprising:
    a computer system including a processor coupled to a volatile memory and a non-volatile memory, the volatile and non-volatile memories for containing computer readable software which when executed by the computer system cause the computer system to implement a method for generating a test program for use in testing a device with ATE, the method comprising the computer implementing the steps of:
        a) receiving a netlist representing a design to be realized in physical form and storing tho netlist in a computer memory unit;
        b) simulating the netlist using the computer implemented synthesis system;
        c) for at least one fault, using the netlist simulation within the computer implemented synthesis system, performing deterministic analysis on the netlist simulation to obtain a first portion of a test program;
        d) using the netlist simulation within the computer implemented synthesis system, performing random analysis on the netlist simulation to obtain a remaining portion of the test program;
        e) storing the first portion and the remaining portion of the test pattern as a complete test pattern in the computer memory unit, the complete test pattern adapted for use with automated test equipment for testing a physical device resulting from the design; and
        f) using deterministic analysis to obtain a balance of the remaining portion of the test pattern if step d) does not successfully obtain all of the remaining portion of the test program.

11. The system of claim 10, wherein the complete test pattern is a hard fault test pattern adapted for use with automated test equipment to detect a hard fault, wherein the hard fault requires a greater number of inputs in comparison to an easy fault to reveal a defect.

12. The system of claim 10, wherein the first portion of the test pattern comprises a first plurality of required values of the test pattern, and the remaining portion of the test pattern comprises a second plurality of required values of the test pattern, the required values each being one of a total number of design for test stimulus required for testing the netlist simulation.

13. The system of claim 10, wherein steps b), c), d), and e) are performed by an automatic test pattern generation pattern running on the computer system.

* * * * *